Figure 2:
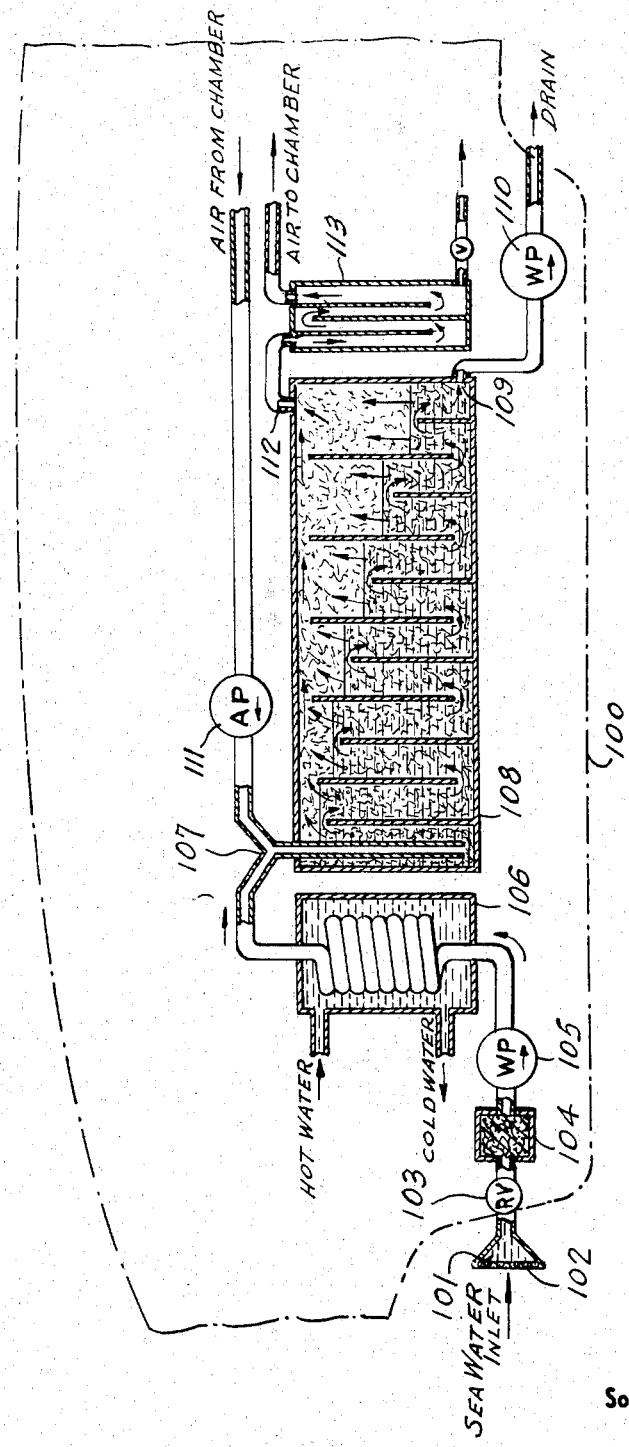

April 16, 1968  S. L. ISOMURA  3,377,777
UNDERWATER GAS EXCHANGE UNIT
Filed March 23, 1966  2 Sheets-Sheet 1
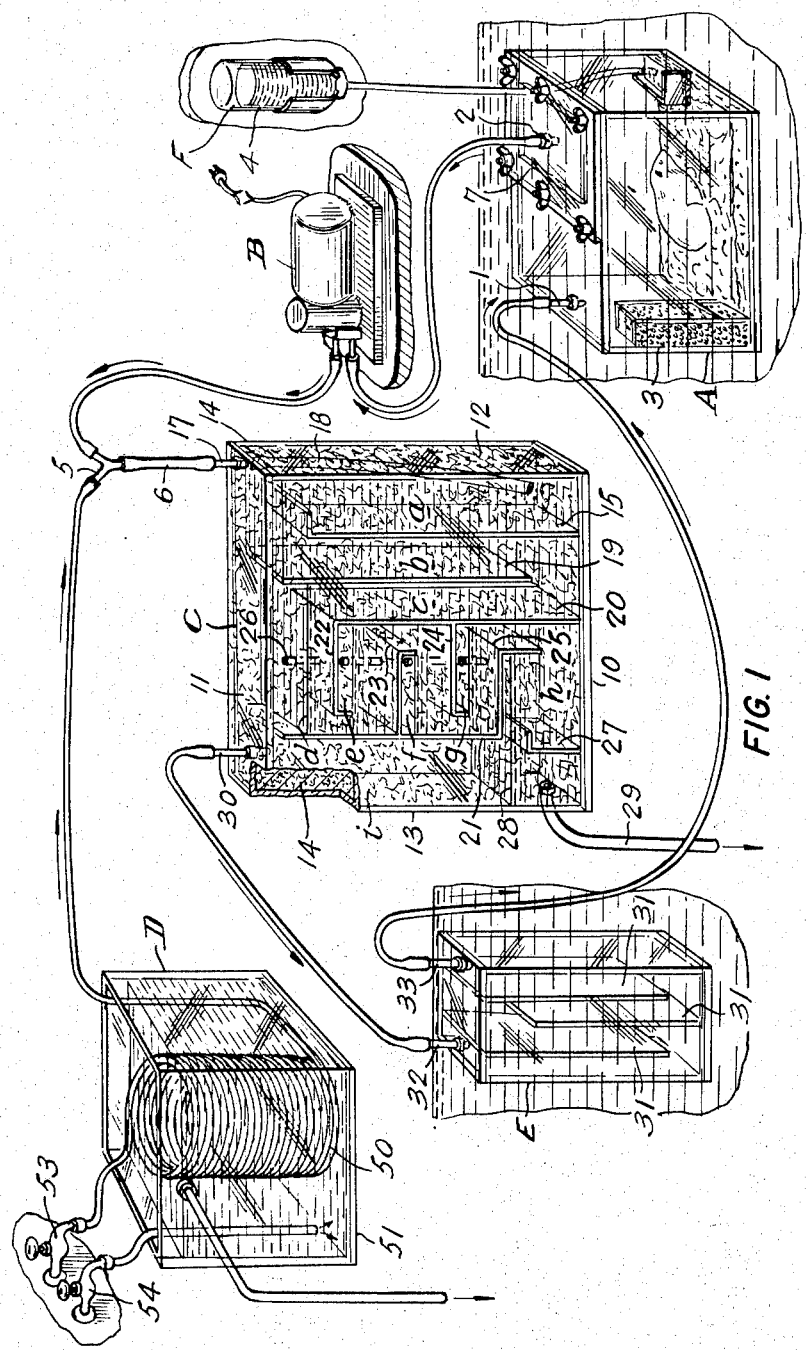
FIG.1
INVENTOR
Soichi Luke ISOMURA
ATTORNEY INVENTOR
Soichi Luke ISOMURA
ATTORNEY United States Patent Office 3,377,777
Patented Apr. 16, 1968

3,377,777
UNDERWATER GAS EXCHANGE UNIT
Soichi Luke Isomura, Montreal, Quebec, Canada, assignor of one-half to John J. Dinan, Montreal, Quebec, Canada
Filed Mar. 23, 1966, Ser. No. 536,676
20 Claims. (Cl. 55—42)

The present invention relates to a method and system of refreshing the air of living quarters for air-breathing creatures, which quarters are deprived of access to the terrestrial atmosphere but have access to a water supply which is in equilibrium with the terrestrial atmosphere.

It is contemplated that the invention may be applied in submarine chambers, buildings or vessels which are cut off from the atmospheric air, but which are surrounded by water containing dissolved gases in equilibrium with the atmosphere and which, therefore, contains relatively large quantities of dissolved components of air, particularly oxygen. The system and method may also be used in controlled laboratory experiments where direct access to atmospheric air is objectionable.

It is well known that marine creatures provided with gills maintain an exchange of oxygen dissolved in water with the blood stream flowing through the gills, such exchange taking place across a semi-permeable membrane which forms the wall of the blood vessels in the gills. Laboratory experiments have been carried out with artificial gills in an attempt to exploit the resources of dissolved oxygen, particularly in sea water, but the employment of a membrane at the interface between the extracting medium and the dissolved gas precludes in the present state of knowledge any rapid availability of the dissolved gas, at least in quantities feasible to support the life of air-breathing creatures.

The present method and system in accordance with the invention has departed from the membrane principle, a free gas-water interface being established and it has been found possible to demonstrate successfully the availability of dissolved atmospheric gases in sufficient quantities to support air breathing creatures.

In accordance with one form of the invention, there is provided a method of refreshing the air of living quarters for air-breathing creatures which quarters are deprived of access to the terrestrial atmosphere but have access to a water supply which is in equilibrium with the terrestrial atmosphere, the method comprising the steps of:

Establishing a feed current of water from said water supply;

Establishing an outward current of stale air from said quarters;

Causing intimate admixture of said higher temperature feed water current and said stale air current to establish gaseous equilibrium between the gases dissolved in the water current and the gases of the stale air current so as preferentially to dissolve carbon dioxide and displace components of atmospheric air from the water;

Passing the resulting gas-water mixture through a gas extraction zone, in the gas extraction zone extracting components of atmospheric air dissolved in said water current under supersaturated solution conditions;

Continuously extracting part of the gas phase in the gas extraction zone;

Removing excess water vapour from said extracted air, and

Supplying the resulting air to said quarters at a rate substantially balancing the rate of extraction of stale air therefrom spent water from the extraction zone being discharged to maintain constant level conditions therein.

Preferably the invention comprises the additional step of raising the temperature of the water above the water temperature of said water supply. Constant pressure is preferably maintained in the gas phase of the extraction zone.

The invention also includes within its scope a system comprising means for carrying out each of the successive method steps above. The method and system may be advantageously employed to refresh air in the living quarters of a submarine vessel or building.

The invention having been generally described, it is hereafter illustrated for the purposes of fuller understanding by reference to the accompanying drawings which set forth an example of a successful laboratory adaptation of the invention and illustrate the application of the invention to larger submarine units, and in which:

FIGURE 1 is a layout diagram showing the components and circuit arrangement of a system for carrying out the invention and suitable for supporting the life of a guinea pig in a sealed container; and FIGURE 2 is a schematic layout showing the components adapted for use in a submarine vessel or building.

In FIGURE 1 there is shown an animal chamber A consisting of a sealed rectangular container (12 inches by 10 inches by 8 inches) of transparent plastics material which in the experiment to be related was submerged in water to prevent any access of atmospheric air directly to the chamber. The chamber was provided with an access opening having a bolted air-tight closure 7. The material used for the chamber walls was an acrylic resin. The chamber was provided in the roof with a plastics inlet tube 1 for refreshed air, and spaced therefrom a similar outlet tube 2 for exhausting stale air, the tubes being welded through the roof and closure respectively. A guinea pig of 700 grams was placed within the animal chamber and fed from an automatic food dispenser 3 of known type and with potable water from a supply 4, for drinking purposes. The outlet 2 was connected by rubber tubing to a constant displacement air pump, which was a "Dynavac" pump, commonly used for laboratory purposes. The output of the pump was connected to one of the arms of a Y junction 5.

Mains water was supplied from a cold tap 53 through a heat exchanger D to the other arm of the glass Y junction 5. The heat exchange unit consisted of a 50-foot length coil 50 of half inch Tygon tubing immersed in a bath 51 which was constantly replenished with hot water from tap 54 to raise the temperature of the cold water about 5° F., in this instance from about 40 up to about 45° F. The flow rate of cold water from the tap was substantially between 1½ to 2 gallons per minute. At the Y junction the heated tap water and the stale air were admixed, and the mixed current of water and air was fed from the central limb of the Y junction to a gas extraction unit C through a further length 6 of rubber tubing.

The foul air and the feed water current were intimately mixed in the rubber tubing line 6, and gas exchange between the foul air and the dissolved gases in the water was found to be very rapid. Since the partial pressure of carbon dioxide in the foul air is higher than that in the water, the carbon dioxide tends to dissolve. This dissolution is enhanced by the high solubility of carbon dioxide in water. Again, since the partial pressure of oxygen in the foul air is lower than that in the water, oxygen is displaced from solution. At the same time, due to the rise in temperature given by the heat exchanger D, the feed water solution was slightly supersaturated with respect to dissolved oxygen and nitrogen.

In the experiments performed by the applicant, it was found that although the desired equilibrium was readily attained and the carbon dioxide absorbed, the crucial factor to successful performance was the extraction of dissolved gases from the water current after equilibrium had been established. The water current maintained in solution more than the theoretical partial pressure of oxygen and nitrogen; in other words, the water was supersaturated with respect to these constituents. It was found necessary to establish a gas-water interface of large area between the water current and the gas phase above the water current which was constituted substantially of air displaced from the water and further to assist the extraction and collection of the dissolved gases by establishing a water-solid-gas interface of large area between the gas and water phases. The gas extraction chamber C constituted such an extraction zone.

The chamber C was constructed to compact within a small volume a large water-gas interface. In the chamber C the water was caused to pass over and around an arrangement of baffles designed to divide the water flow, within the volume available, into a succession of what may be described as shallow lakes, each having a large surface open to the gas phase. At the same time, a solid of large irregular surface area was distributed throughout the zone or volume within the chamber C to bridge the water and gas phases and to provide a medium within the water phase upon which the bubbles of gas could form and collect and pass upwardly to the surface.

It will be appreciated that the gas extraction zone may be constructed in a great many different ways. Furthermore, the efficiency of the gas extraction chamber on a volume basis will not be an important factor if the volume available for the gas extraction zone is unlimited. In such an event a single continuous gas-water interface would probably be sufficient, if the tank in which it was contained was of sufficient size, if also the gas collection was assisted by the distribution of a solid contact medium. The gas extraction zone is desirably of such a size and construction, particularly with regard to the area of the interfaces relative to the rate of passage of water, that the partial pressure of the gas phase and the partial pressure of the dissolved gas in the water phase is brought at least nearly to the theoretical equilibrium partial pressures by the time the water current leaves the extraction zone.

It is an important preferred feature of the invention, however, that the extraction of the gas need not be brought exactly to theoretical completion, since a source of supply of oxygen over and above the theoretical amount displaced by the carbon dioxide, is provided by increasing the temperature of the feed water in the heat exchange unit D. Thus, the rise in temperature of the feed water current may be adjusted to displace sufficient air from solution to balance any loss of air pressure from the extraction zone gas phase due to sub-maximum efficiency of the air extraction. It will be apparent, however, that any small loss of pressure may be corrected by alternative means, such as allowing a small amount of air or oxygen to bleed into the gas phase from supplementary gas cylinders, if desired, through an automatic pressure responsive valve.

The chamber C used in the present experiment was an elongate rectangular chamber 16 inch by 16 inch by 2½ inch formed of cemented transparent acrylic sheets, consisting of a floor 10, roof 11, a first end wall 12, an opposite end wall 13, and lateral side walls 14. Spaced slightly from end wall 12, and extending between the side walls 14 from the floor 10 to a point slightly below the roof 11, was a first baffle 15, provided with a horizontal lip extending slightly towards the end wall 12. The baffle 15 defined a first compartment $a$ between itself and the end wall 12. A short plastic tube 17 was welded through the roof 11 over the compartment $a$ and connected to the line 6 and an extension tube 18 to a point near the bottom of the compartment $a$. The mixture of water and air was therefore caused to flow upwardly through compartment $a$ and over the lip of the baffle 15 into a second compartment $b$, which was defined by a second vertical baffle 19, extending between the side walls 14 from a point near the roof to a point spaced slightly from the floor 10. The water was, therefore, caused to flow downwardly through compartment $b$ and under the bottom of baffle 19. The gap between baffle 19 and the roof allowed continuity of the air space or gas phase. After passing under baffle 19, the water passed into a third vertical compartment $c$ defined by a third baffle 20 extending between the side walls from the floor to a point below the level of the top of the baffle 15 and, therefore, the water was caused to flow upwardly through compartment $c$ and over the top of baffle 20.

A fourth vertical baffle 21 was provided between baffle 20 and the opposite end wall 13, and this baffle extended between the side walls from a point near the roof to an intermediate point nearer the floor than the roof. Extending alternately from baffles 20 and 21 were horizontal baffles 22, 23, 24, and 25. Baffle 22 extended from the top of baffle 20 towards the baffle 21, terminating short of the baffle 21 with a slight downward lip. No space was allowed between the horizontal baffles and the side walls 14 so that the baffles formed a zig-zag water course extending towards the floor of the chamber. Similarly, baffle 23 extended from baffle 21 towards but short of baffle 20 and also terminated in a short downward lip, baffle 24 extended from the baffle 20 towards the baffle 21 but short of the latter and also extended in a short downward lip, and baffle 25 extended from the bottom edge of baffle 21 towards but short of the baffle 20 and terminated in a rather larger downward lip. The horizontal baffles 22, 23, 24, 25 defined between the baffles 20 and 21 a series of vertically superposed compartments $d$, $e$, $f$, $g$, and $h$. Compartment $d$ was open to the gas phase at the top of the chamber C, and the lips on baffles 22, 23, and 24 defined air pockets at the top of compartments $e$, $f$, and $g$ to provide each of these compartments with a water-gas interface. The horizontal baffles 22, 23, 24, 25 were provided with apertures and welded therearound short lengths of plastic tubing 26 which extended upwardly through the water in each compartment so as to cause intercommunication of the air pockets with each other and with the gas phase near the roof of the chamber C.

After leaving compartment $g$, the water passed under the downward lip of baffle 25 into compartment $h$, that is, the lowermost of the vertically superposed compartments. The water then passed over a short vertical baffle 27 extending from between the side walls to a distance below the bottom of baffle 21, into the opposite end compartment $i$. The baffle 27 maintained a head of water 28 in the end compartment $i$ and a drain tube 29 led out from a point near the floor of that compartment.

The whole chamber C was filled with low density, loosely matted glass fibres (not illustrated for the sake of clarity). The glass fibre stock used was obtained from matted glass wool adapted for use in air filters of conventional type ("Amer-Glas" sold by American Air Filters of Canada). The glass wool provided a dispersed solid phase bridging the air and water phases within the extraction chamber C and allowed the super-dissolved gas in the water to collect on the large surface area provided by the fibres and travel upwards to the surface of each compartment and from there to the continuous gas phase extending around the upper part of the chamber C. Due to the compartmentation, the total gas/water interface in the chamber C was approximately 90 square inches.

A second short length of acrylic plastic tubing 30 was welded through the roof of chamber C over compartment $i$ and rubber tubing was connected between the tube 30 and the input of a condenser unit E. The purpose of the condenser unit was to reduce the relative humidity of the air current which was continuously extracted from the top of the gas extraction chamber C. The condenser consisted of a rectangular chamber made from welded acrylic resin sheets in a similar manner to chamber C. In the condenser E the air was caused to follow a tortuous path defined by vertical baffles 31 which extended alternately from the roof and floor, between side walls, from the inlet tube 32 to the outlet tube 33. The inlet and outlet tubes were short lengths of acrylic plastic tubing welded through the roof of the condenser chamber. The whole condenser chamber was immersed in cold water to maintain it at a cool temperature.

From the outlet tube 33 of the condenser, the relatively dry air was passed to the inlet tube 32 of the animal chamber by means of a length 34 of rubber tubing. The replenishment of oxygen in the animal chamber A was controlled by the rate of flow of water through the system. The air pump B extracted stale air at a sufficient rate (600 ccs./min.) to maintain adequate turnover of the air. A water flow rate of between 1 and 2 gallons per minute was found to be sufficient. The normal partial pressure of oxygen in atmospheric air is 158 millimeters of mercury or a volume percent of about 20%. However, with a flow rate of water of approximately 2 gallons per minute, the oxygen content in the animal chamber was maintained at about 140 mm. Hg or about 18 volume percent. It was found that when the water flow was reduced to 1 gallon per minute, the oxygen content in the animal chamber A was reduced to about 16%, at the ambient temperatures used.

A 700 gram guinea pig within the animal chamber A was maintained in healthy active condition for twelve days. After this period, the experiment was discontinued due to the undesirable level of excrement within the chamber. The animal was lively and active throughout the experiment. In a control experiment in which a similar weight guinea pig was placed in the chamber and air was circulated without flow of fresh water, the animal expired within seven hours.

It is possible for air-breathing creatures to live at slightly reduced partial pressures of oxygen such as is encountered at high altitudes, but generally speaking, the partial pressure of oxygen should be at least 100 millimeters of mercury. No difficulty was experienced in maintaining the necessary partial pressure of oxygen in the animal chamber. If the heat exchange unit D was not used, there was a tendency for the water level in the air extraction chamber to rise due to the submaximum efficiency of extraction of the dissolved gases in the water. It is possible that the use of a larger unit would have avoided this problem, but the problem was more readily solved by provision of the heat exchange unit which reduced the theoretical equilibrium content of dissolved oxygen in the water, thus balancing the relative inefficiency of the extraction unit.

It will be apparent to those skilled in the art that the experimental system above described can readily be adapted on a larger scale to provide sufficient volume of water for the refreshing of living quarters for one or more human beings. FIGURE 2 illustrates a system adapted for use in an underwater vessel or, for example, research station, and making use of the ambient sea water, to provide the necessary oxygen.

In FIGURE 2 there is shown in dotted lines a housing 100 which may be, for example, a hull of a vessel or the wall of an underwater chamber. At one end there is provided a sea water inlet 101 covered by a screen 102 for coarse filtration. The sea water is led through a pressure reducing valve 103, which is conventional equipment, to a filter 104 and thence to a water pump 105 to a heat exchanger unit 106, which may be, for example, a larger scale version of the heat exchange unit D of FIGURE 1, and where the sea water is raised in temperature by heat exchange with hot water, for example, from the boiler of the vessel, its motors or propulsion system, or some similar source. After passing through the heat exchange unit 106, the water passes through a junction 107 where it is mixed with stale air from the living quarters, and the mixed air and water passes through a gas extraction unit 108. The gas extraction unit and condenser may, if desired, be placed on a gimbal.

The gas extraction unit 108 is shown differently arranged from the chamber C of FIGURE 1, to illustrate a modified system of baffles. In the extraction unit 108 of FIGURE 2 the baffles are all arranged vertically with horizontal spacing, and alternate baffles have spacing between their lower edge and the floor of the unit so that the water is caused to flow under and over alternate baffles, the water level gradually decreasing in height towards the outlet 109. It will be apparent that the unit 108 is less efficient on a volume basis than the chamber C of FIGURE 1 in that for the same water-gas interface, a larger volume is necessary. The unit 108 (like the chamber C) is preferably also filled with a solid dispersed or integral phase possessing a large irregular surface area which may, for example, be loosely matted fibres of non-corroding material such as glass or mineral or slag wool or loosely packed granular material, or for example, glass beads, asbestos, mica, and sponge material. From the outlet 109 the water passes to a second water pump 110 whence it is pumped out into the sea on the other side of the living quarters. An air pump 111 extracts stale air from the living quarters for admixture with sea water at junction 107. Fresh air from the extraction unit 108 passes through outlet 112 to a condenser unit 113 and thence to a fresh air inlet in the living quarters. The condenser unit may be of any conventional type commonly used in air conditioning systems. The fresh air may be passed through other conventional air conditioning units before proceeding to the living quarters for control of the humidity and temperature.

The condenser unit 113 provides the additional advantage that it may be used as a source of potable water. Since the interior of the housing 100 may be at a lower ambient pressure than the sea water outside the water will have to be pumped out of the housing, but it may be possible to dispense with the second water pump 105. The components of the system shown in FIGURE 2 may be made from conventional materials as will be readily apparent to naval engineers or architects. It is contemplated that the system may be used at any depth, since water is incompressible, and the partial pressure of dissolved gases would be dependent only upon the content in the terrestrial atmosphere at the water surface. At great depths, difficulties may be encountered in providing a water pump with sufficient capacity, if the pressure of the water is reduced as it enters the vessel or building. However, the reduction in pressure at the inlet 101 may be obtained by causing the incoming water to rotate a turbine which is connected to assist the water outlet pump 110. Since at a depth the temperature of the sea water is generally cooler, the volume percent of available oxygen will be increased.

It will be apparent that the present system can be assisted if desired by the use of additional supplies of oxygen, and/or the use of chemicals to absorb some of the carbon dioxide. It will also be apparent that the water may be heated in the gas extraction zone instead of being heated immediately upon leaving the water supply. Many further modifications may be made within the scope of the following claims.

I claim:

1. A method of refreshing the air of living quarters for air-breathing creatures which quarters are deprived of access to the terrestrial atmosphere but have access to a water supply which is in equilibrium with the terrestrial atmosphere, the method comprising the steps of:

establishing a feed current of water from said water supply;

establishing an outward current of stale air from said quarters;

causing intimate admixture of said feed water current and said stale air current to establish gaseous equilibrium between the gases dissolved in the water current and the gases of the stale air current so as preferentially to dissolve carbon dioxide and displace components of atmospheric air from the water;

passing the resulting gas-water mixture through a gas extraction zone, in the gas extraction zone extracting components of atmospheric air dissolved in said water current under supersaturated solution conditions;

continuously extracting part of the gas phase in the gas extraction zone;

removing excess water vapour from said extracted air; and supplying the resulting air to said quarters at a rate substantially balancing the rate of extraction of stale air therefrom, spent water from the extraction zone being discharged to maintain constant level conditions therein.

2. A method as claimed in claim 1 comprising the additional step of raising the temperature of the water above the water temperature of said water supply.

3. A method as claimed in claim 2 wherein constant pressure is maintained in said gas phase of said gas extraction zone.

4. A method of refreshing the air of living quarters for air-breathing creatures which quarters are deprived of access to the terrestrial atmosphere but have access to a water supply containing dissolved gases in equilibrium with the terrestrial atmosphere, the method comprising the steps of:

establishing a feed current of water from said water supply;

raising the temperature of the water in said feed current above the water temperature of said water supply;

establishing an outward current of stale air from said quarters;

causing intimate admixture of said higher temperature feed water current and said stale air current to establish gaseous equilibrium between the gases dissolved in the water current and the gases of the stale air current so as preferentially to dissolve carbon dioxide and displace components of atmospheric air from the water;

passing the resulting gas-water mixture through a gas extraction zone;

in the gas extraction zone:
(a) establishing a gas-water interface of large area between the resulting water current and a gas phase above the water current consisting substantially of air displaced from said water current, and
(b) establishing a water-solid-gas interface of large area between the gas and water phases and a solid phase of large irregular surface area bridging such phases so as to extract components of atmospheric air dissolved in said water current under supersaturated solution conditions;

continuously extracting part of the gas phase in the gas extraction zone in an amount to maintain substantially constant pressure in said gas phase;

removing excess water vapour from said extracted air; and supplying the resulting air to said quarters at a rate substantially balancing the rate of extraction of stale air therefrom, spent water from the extraction zone being discharged to maintain constant level conditions therein.

5. A method as claimed in claim 4 wherein the areas of said gas-water interface and said water-solid-gas interface in said extraction zone are of sufficient magnitude in relation to the rate of passage of water to bring the partial pressure of the gas phase and the partial pressure of dissolved gas in the extraction zone at least nearly to the theoretical equilibrium partial pressure by the time the water current leaves the extraction zone.

6. A method as claimed in claim 5 wherein the said rise in temperature of said feed current of water is adjusted to displace sufficient air from solution to balance loss of air pressure in said extraction zone gas phase due to sub-maximum efficiency of air extraction.

7. A method as claimed in claim 6 wherein the rate of supply of feed water is adjusted to supply sufficient dissolved air to maintain adequate atmospheric conditions in said living quarters in dependence upon the rate of oxygen consumption therein.

8. A method as claimed in claim 7 wherein in said extraction zone said water current is caused to flow through a sequence of compartments, the gas phase being continuous throughout the compartments and the compartments being substantially filled with a non-corroding fibrous material.

9. A method as claimed in claim 8 wherein the fibrous material consists essentially of loosely matted glass fibres.

10. A method as claimed in claim 9 wherein at least some of the compartments are arranged in superposed relationship each having entrapped pockets of air above the water level therein, said pockets being in communication one with the others.

11. A system for refreshing the air of living quarters for air-breathing creatures which quarters are deprived of access to the terrestrial atmosphere but have access to a water supply containing dissolved gases in equilibrium with the terrestrial atmosphere, the system comprising:

means for establishing a feed current of water from said water supply;

means for establishing an outward current of stale air from said quarters;

means for causing intimate admixture of said feed water current and said stale air current so as to establish gaseous equilibrium between the gases dissolved in the water current and the gases of the stale air current and so as preferentially to dissolve carbon dioxide and displace components of atmospheric air from the water;

an air extraction chamber having an input communicating with said mixing means;

a water discharge outlet at a low level;

an air outlet at a high level;

means in the chamber for establishing a gas-water interface of large area between the water flowing through the chamber and a gas phase above the water consisting substantially of air displaced from said water current;

a solid phase of inert material possessing a large irregular surface area bridging said gas and water phases and establishing a water-solid-gas interface of large area between such gas and water phases;

the gas extraction chamber being adapted to extract components of atmospheric air dissolved in said water current under supersaturated solution conditions;

means for causing the continuous extraction of part of the gas phase in the gas extraction chamber in an amount to maintain substantially constant pressure in said gas phase;

means for conducting said extracted air;

condensing means in series with said conducting means for removing excess water vapour from said extracted air;

said conducting means being connected to supply the resulting air to said quarters;

said means for extracting air from the extraction chamber being adjusted to supply the resulting air to said quarters at a rate substantially balancing the rate of extraction of stale air from the quarters.

12. A system as claimed in claim 11 further comprising means for raising the temperature of the water above the water temperature of said water supply.

13. A system as claimed in claim 12 wherein the areas of said gas-water interface and said water-solid-gas interface in said extraction zone are of sufficient magnitude to bring the partial pressure of the gas phase and the partial pressure of dissolved gas in the extraction zone at least nearly to the theoretical equilibrium partial pressure by the time the water current leaves the extraction zone.

14. A system as claimed in claim 13 wherein said means for supplying feed water is of a capacity adjustable to supply sufficient dissolved air to maintain approximately normal atmospheric conditions in said living quarters under normal occupancy conditions in dependence upon the rate of oxygen consumption therein.

15. A system as claimed in claim 14 wherein said extraction chamber is partly divided internally by a plurality of baffles into compartments through which the water is caused to flow in sequence, each compartment having a gas-water interface, the gas phase above the water being substantially continuous, and wherein each compartment is substantially filled with a non-corroding fibrous material constituting said dispersed solid phase.

16. A system as claimed in claim 15 wherein the fibrous material consists essentially of loosely matted glass fibers.

17. A system as claimed in claim 16 wherein at least some of the compartments are arranged in superposed relationship, the compartment further comprising water overflow means establishing a water level in each compartment, means for entrapping air in pockets at the top of each compartment, and means allowing escape of air from the pockets to a common air space at the top of the chamber.

18. A system as claimed in claim 17 wherein the said extraction chamber is elongate and comprises side walls, a floor and a roof, a first vertical baffle displaced towards one end of the chamber, extending between opposite side walls from the floor thereof to a level near the roof and defining an end compartment, said chamber outlet leading to said end compartment near said floor;

a second vertical baffle spaced from said first baffle in a direction extending between opposite side walls to a level near said floor away from said one end, and defining a second compartment;

a third vertical baffle spaced from said second baffle in said direction, extending between opposite side walls from said floor to a level near said roof, and defining a third compartment;

a fourth vertical baffle spaced from said third baffle and from the end of the compartment opposite said one end and extending between said side walls from a level near said roof an intermediate level nearer the floor than the roof;

a plurality of horizontal baffles extending alternately from the third and fourth baffles partly across the space between the third and fourth baffles and defining therewith vertical superposed compartments;

each horizontal baffle having a downward lip at its free end to establish an air pocket in the roof of each said superposed compartment;

each horizontal baffle having an aperture and conduit means extending upwardly from the aperture to allow intercommunication between the air pockets and with gas trapped below the roof of the chamber;

and a fifth vertical baffle extending a short way upwardly from said floor between said side walls near said opposite end defining an opposite end compartment containing said water discharge outlet, whereby water is caused to flow upwardly in said end compartment, downwardly in said second compartment, upwardly in said third compartment, successively downwardly through the superposed compartments, over said fifth baffle and to maintain a head in said opposite end compartment substantially level with the height of the fifth baffle;

said chamber being substantially filled with loosely matted glass fibres.

19. A system as claimed in claim 12 applied to living quarters in a submarine vessel.

20. A system as claimed in claim 12 applied to living quarters in a submarine building.

No references cited.

REUBEN FRIEDMAN, *Primary Examiner.*

C. N. HART, *Assistant Examiner.*